(12) United States Patent
Fan et al.

(10) Patent No.: US 12,366,302 B1
(45) Date of Patent: Jul. 22, 2025

(54) AIR INFLATION-DEFLATION VALVE

(71) Applicant: Dongguan Chaodian E-commerce Co., Ltd., Dongguan (CN)

(72) Inventors: Zhexin Fan, Dongguan (CN); Zhaowu Wang, Dongguan (CN)

(73) Assignee: Dongguan Chaodian E-commerce Co., Ltd., Dongguan (CN)

( * ) Notice: Subject to any disclaimer, the term of this patent is extended or adjusted under 35 U.S.C. 154(b) by 0 days.

(21) Appl. No.: 19/019,574

(22) Filed: Jan. 14, 2025

(30) Foreign Application Priority Data

Jan. 24, 2024 (CN) .......................... 202420165306.1

(51) Int. Cl.
*F16K 24/00* (2006.01)
*B60C 29/06* (2006.01)
*F16K 15/20* (2006.01)

(52) U.S. Cl.
CPC ............ *F16K 24/00* (2013.01); *B60C 29/068* (2013.01); *F16K 15/207* (2013.01); *Y10T 137/3646* (2015.04)

(58) Field of Classification Search
CPC ..... B60C 29/068; F16K 15/20; F16K 15/207; Y10T 137/3646; Y10T 137/7777; Y10T 137/778; Y10T 137/86944
See application file for complete search history.

(56) References Cited

U.S. PATENT DOCUMENTS

| | | | | |
|---|---|---|---|---|
| 1,004,986 A * | 10/1911 | Burkett | .................... | F16K 15/20 220/231 |
| 1,114,047 A * | 10/1914 | Ruggles | .................. | F16K 15/20 137/226 |
| 1,216,919 A * | 2/1917 | Ashelman | ............... | F16K 15/20 137/226 |
| 1,269,694 A * | 6/1918 | Faires | ..................... | F16K 15/20 137/226 |
| 1,934,572 A * | 11/1933 | Sutton | ..................... | F16K 15/20 137/226 |
| 2,690,757 A * | 10/1954 | Orchowski | ............. | F16K 15/20 137/493.6 |
| 3,450,147 A * | 6/1969 | Webb | ................... | B60C 23/0496 137/230 |
| 3,454,033 A * | 7/1969 | Smith | .................... | F16K 15/207 137/493.6 |
| 2007/0023083 A1* | 2/2007 | Huang | .................. | F16K 15/026 137/226 |

* cited by examiner

*Primary Examiner* — Robert K Arundale
(74) *Attorney, Agent, or Firm* — Zhigang Ma

(57) ABSTRACT

An air inflation-deflation valve includes an inflation head, a rubber seat, an inner sleeve, a shell, a first elastic part, a plug chamber, an air inlet rubber plug, a second elastic part and an air outlet rubber plug. When the air inflation-deflation valve is in use, the inflation head is inserted into a rubber chamber to contact an air port, external air enters an air passage, pushing open the air inlet rubber plug, and then enters inner chambers of inflatable products. After inflation, the second elastic part blocks the air passage. During deflation, the inflation head drives the rubber seat and inner sleeve to move, causing the air outlet port to open, thus the air is discharged through the inflation head. An overall structure of the air inflation-deflation valve is simple, easy to use, quick for inflation and deflation, and meets needs of various inflatable products.

6 Claims, 6 Drawing Sheets

AIR INFLATION-DEFLATION VALVE

CROSS-REFERENCE TO RELATED APPLICATION

This application claims priority to Chinese Patent Application No. 202420165306.1, filed Jan. 24, 2024, which is herein incorporated by reference in its entirety.

TECHNICAL FIELD

The disclosure relates to the field of air valves, and more particularly to an air inflation-deflation valve.

BACKGROUND

With the improvement of living standards, more and more inflatable products such as inflatable pillows, inflatable toys, and inflatable massagers appear in people's lives. The inflatable products are equipped with air valves at their openings. During inflation, air pumps or other air source devices push air into the inflatable products through the air valves, thereby making the inflatable products full and can be used normally. Therefore, the quality of the air valves directly affects the use of the inflatable products. The shortcomings of existing air valves in the related art include: complex structures, time-consuming production and assembly, inconvenience for inflation and deflation, susceptibility to jamming and blockage, and easy deformation by external forces.

SUMMARY

In view of the above-mentioned shortcomings of existing air valves in the related art, the disclosure provides an air valve with a simple structure, which is convenient to use and has dual-purpose for inflation and deflation. The specific technical solution is as follows.

An air inflation-deflation valve (also referred to as air charging and discharging valve), includes an inflation head, a rubber seat, an inner sleeve, a shell, a first elastic part, a plug chamber, an air inlet rubber plug, a second elastic part and an air outlet rubber plug; a rubber chamber is defined in the rubber seat and is configured to allow the inflation head to be inserted, and the rubber seat is installed in the inner sleeve; the shell defines a first chamber and a second chamber separated from each other, the inner sleeve is movably sleeved in the first chamber of the shell, and the first elastic part is installed in the first chamber and is in contact with the inner sleeve; a center of the inner sleeve is connected to the plug chamber, a part of the plug chamber is defined in the first chamber, and the other part of the plug chamber is defined in the second chamber; the plug chamber is defined with an air port configured to be in contact with the inflation head, an air passage is defined in the plug chamber, the air port is connected to the air passage, and an air outlet port is disposed on a side of the plug chamber; and the air outlet rubber plug is installed in the second chamber and is sleeved around a peripheral side of the plug chamber, and the air outlet port is pressed by the air outlet rubber plug when the air inflation-deflation valve is an inactivated state.

In an embodiment, a front of the inflation head is a sphere, the sphere is in interference fit with the rubber chamber, a back end of the sphere is connected to an arc-shaped limiting edge, and the arc-shaped limiting edge is in contact with a side wall of the rubber seat.

In an embodiment, an escape groove is defined on a front of the sphere.

In an embodiment, the center of the inner sleeve is threadedly connected to the plug chamber.

In an embodiment, the first elastic part and the second elastic part are tower-shaped springs.

In an embodiment, the plug chamber is T-shaped.

Beneficial effects: when the air inflation-deflation valve is in use, the inflation head is initially inserted into the rubber chamber to contacts the air port, external air enters the air passage through the inflation head using an air pipe, pushing open the air inlet rubber plug, and then enters an inner chamber of an inflatable product through the second chamber. After inflation is completed, the inflation head is pulled out, and the second elastic part drives the air inlet rubber plug to block the air passage under normal conditions (i.e., when the air inflation-deflation valve is an inactivated state) to ensure that the air will not be exposed. During deflation, the inflation head is driven to move the rubber seat and the inner sleeve, and the inner sleeve drives the plug chamber to move. The air outlet rubber plug will no longer press the air outlet port. The second chamber is connected to the air passage through the air outlet port, and the air passage is connected to the inflation head for deflation. An overall structure design of the air inflation-deflation valve is simple, easy to use, quick for both inflation and deflation, and meets needs of various inflatable products.

DETAILED DESCRIPTION OF EMBODIMENTS

Figure 1:
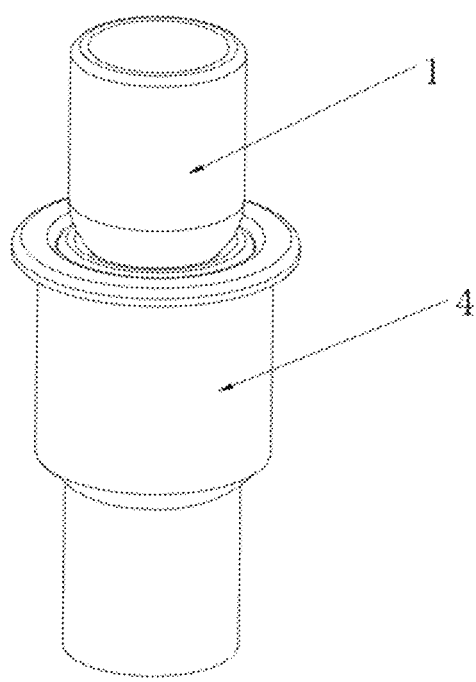
FIG. 1 illustrates an overall perspective view of an air inflation-deflation valve of the disclosure.
Figure 2:
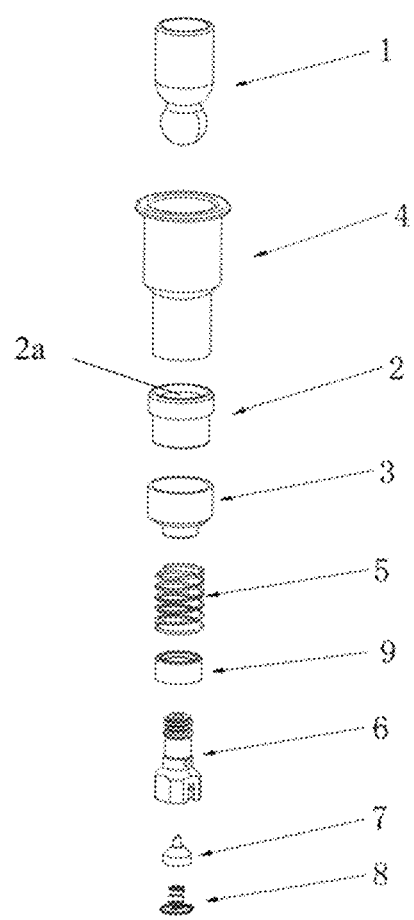
FIG. 2 illustrates an exploded view of the air inflation-deflation valve of the disclosure.

The specific embodiment of the disclosure is further described below in combination with the accompanying drawings.

In the description of the disclosure, it should be noted that terms such as "center", "up", "down", "left", "right", "vertical", "horizontal", "inner" and "outer" indicating directions or positional relationships are based on the directions or positions shown in the accompanying drawings. They are used solely for the convenience of describing the disclosure and simplifying the description, rather than indicating or implying that the positions or components must have specific orientations or be constructed and operated in specific directions. Therefore, they should not be construed as limitations on the disclosure.

In the description of the disclosure, it should be noted that unless otherwise specifically defined and limited, terms such as "installation", "connection" and "linkage" should be understood in a broad sense. For example, they can refer to fixed connections, detachable connections, or integral connections; they can be mechanical connections or electrical connections; they can be direct connections or indirect connections through an intermediary medium; they can also be internal connections between two components. For those skilled in the art, the specific meanings of the aforementioned terms in the context of the disclosure can be understood according to the specific circumstances.

As shown in FIGS. 1-5, an air inflation-deflation valve includes an inflation head 1, a rubber seat 2, an inner sleeve 3, a shell 4, a first elastic part 5, a plug chamber 6, an air inlet rubber plug 7, a second elastic part 8 and an air outlet rubber plug 9. A rubber chamber 2a is defined in the rubber seat 2 and is configured to allow the inflation head 1 to be inserted, and the rubber seat 2 is installed in the inner sleeve 3. The shell 4 defines a first chamber 4a and a second chamber 4b separated from each other. The inner sleeve 3 is movably sleeved in the first chamber 4a of the shell 4, and the first elastic part 5 is installed in the first chamber 4a and is in contact with the inner sleeve 3. A center of the inner sleeve 3 is threadedly connected to the plug chamber 6, a part of the plug chamber 6 is defined in the first chamber 4a, and the other part of the plug chamber 6 is defined in the second chamber 4b. The plug chamber 6 is defined with an air port configured to be in contact with the inflation head 1, an air passage 6b is defined in the plug chamber 6, the air port 6a is connected the air passage 6b, and an air outlet port 6c is disposed on a side of the plug chamber 6. The air outlet rubber plug 9 is installed in the second chamber 4b and is sleeved around a peripheral side of the plug chamber 6, and under normal conditions, the plug chamber 6 is not moved, thus the air outlet port 6c is pressed by the air outlet rubber plug 9.

Figure 3:
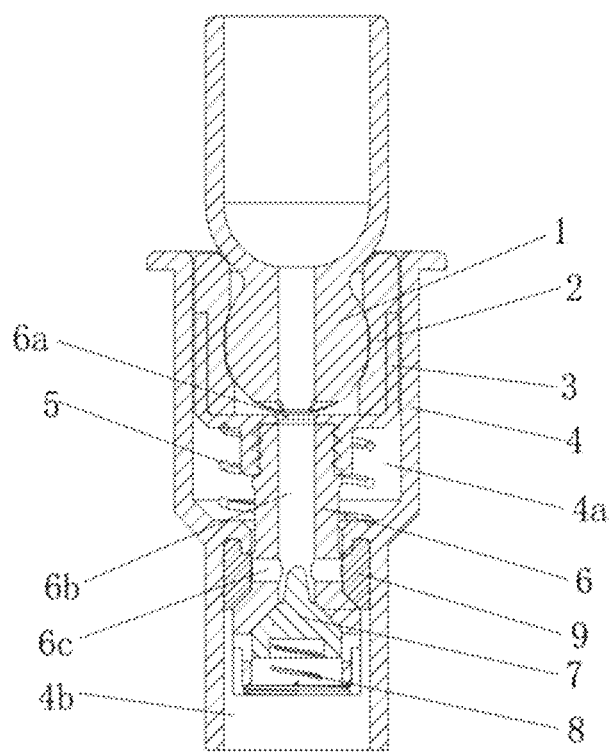
FIG. 3 illustrates a cross-sectional view of the air inflation-deflation valve of the disclosure.
Figure 4:
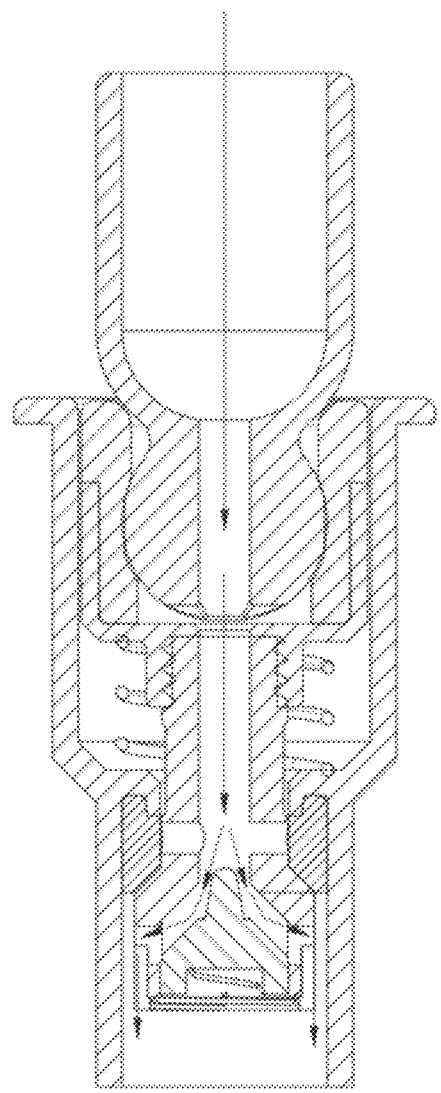
FIG. 4 illustrates a schematic diagram of an air flow direction when the air inflation-deflation valve is inflated.
Figure 5:
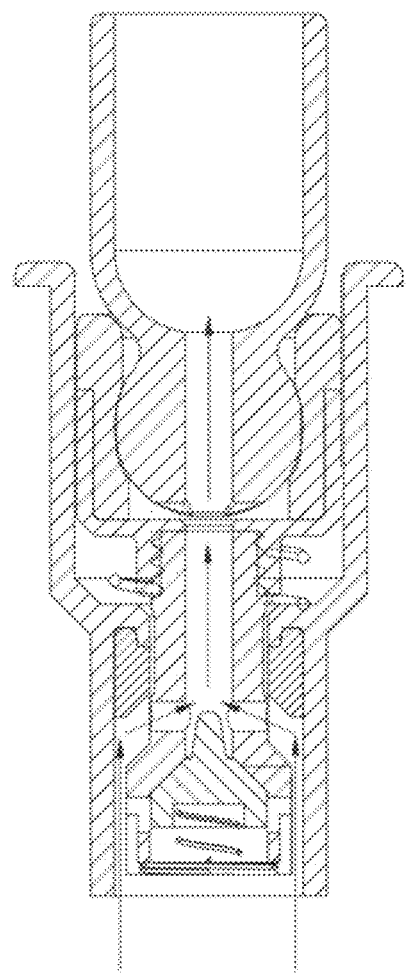
FIG. 5 illustrates a schematic diagram of an air flow direction when the air inflation-deflation valve is deflated.
Figure 6:
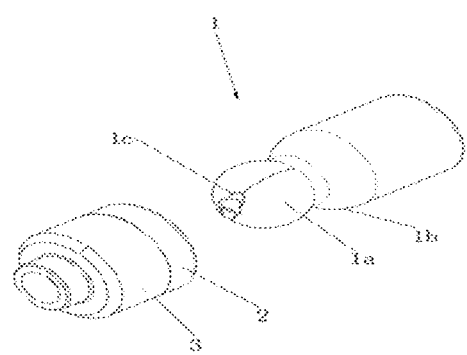
FIG. 6 illustrates a perspective view of an inflation head and an inner sleeve in cooperation in the disclosure.
Figure 7:
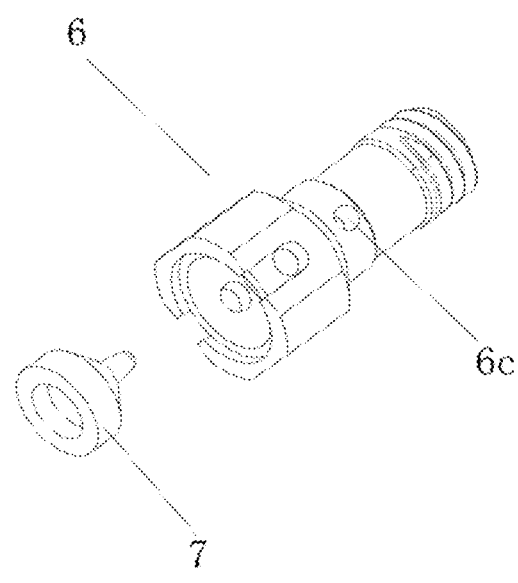
FIG. 7 illustrates a perspective view of a plug chamber and an air inlet rubber plug in cooperation in the disclosure.

As shown in FIG. 3, FIG. 6 and FIG. 7, a front of the inflation head 1 is a sphere 1a, and the sphere 1a is in interference fit with the rubber chamber 2a. Because the rubber seat is made of soft rubber, after the sphere 1a is inserted into the rubber chamber 2a, the rubber chamber 2a can expand under force to make a tight contact with the sphere 1a. A back end of the sphere 1a is connected to an arc-shaped limiting edge 1b, the arc-shaped limiting edge 1b is configured to increase a width at the back end of the sphere 1a, and the arc-shaped limiting edge 1b is in contact with a side wall of the rubber seat 2. When the inflation head 1 is moved under force, the arc-shaped limiting edge 1b can push against the rubber seat 2 and the inner sleeve 3 to move. Because the center of the inner sleeve 3 is threadedly connected to the plug chamber 6, the plug chamber 6 will also move along with the inner sleeve 3. Additionally, an escape groove 1c is defined on a front of the sphere 1a, and the air port 6a is trumpet-shaped.

Specifically, the first elastic part 5 and the second elastic part 8 are tower-shaped springs, and the plug chamber 6 is T-shaped.

Working principle: during inflation, an inflation device inflates through a connecting pipe to the inflation head 1, air enters the air passage 6b through the inflation head 1, thereby pushing open the air inlet rubber plug 7, and then enters an inner chamber of an inflatable product through the second chamber 4b. During deflation, no air enters the inflation head 1. The inflation head 1 is pressed to move the rubber seat 2 and the inner sleeve 3, and the inner sleeve 3 drives the plug chamber 6 to move. The air outlet port 6c of the plug chamber 6 is not pressed by the air outlet rubber plug 9, and the second chamber 4b is connected the air passage 6b through the air outlet port 6c (because a lower end of the air passage 6b is blocked by the air inlet rubber plug 7). The air enters the rubber chamber 2a and the escape groove 1c through the air passage 6b, and is discharged from the inflation head 1.

The above content is a further detailed explanation of the disclosure in conjunction with specific preferred embodiments. It should not be construed to limit the specific implementations of the disclosure to these descriptions. For those skilled in the related art, simple deductions or substitutions can be made without departing from the conception of the disclosure, and all such variations should be considered within the scope of protection of the disclosure.

What is claimed is:

1. An air inflation-deflation valve, comprising an inflation head, a rubber seat, an inner sleeve, a shell, a first elastic part, a plug chamber, an air inlet rubber plug, a second elastic part and an air outlet rubber plug; wherein a rubber chamber is defined in the rubber seat and is configured to allow the inflation head to be inserted, and the rubber seat is installed in the inner sleeve; the shell defines a first chamber and a second chamber separated from each other, the inner sleeve is movably sleeved in the first chamber of the shell, and the first elastic part is installed in the first chamber and is in contact with the inner sleeve; a center of the inner sleeve is connected to the plug chamber, a part of the plug chamber is defined in the first chamber, and the other part of the plug chamber is defined in the second chamber; the plug chamber is defined with an air port configured to be in contact with the inflation head, an air passage is defined in the plug chamber, the air port is connected to the air passage, and an air outlet port is disposed on a side of the plug chamber; and the air outlet rubber plug is installed in the second chamber and is sleeved around a peripheral side of the plug chamber, and the air outlet port is pressed by the air outlet rubber plug when the air inflation-deflation valve is an inactivated state.

2. The air inflation-deflation valve as claimed in claim 1, wherein a front of the inflation head is a sphere, the sphere is in interference fit with the rubber chamber, a back end of the sphere is connected to an arc-shaped limiting edge, and the arc-shaped limiting edge is in contact with a side wall of the rubber seat.

3. The air inflation-deflation valve as claimed in claim 2, wherein an escape groove is defined on a front of the sphere.

4. The air inflation-deflation valve as claimed in claim 1, wherein the center of the inner sleeve is threadedly connected to the plug chamber.

5. The air inflation-deflation valve as claimed in claim 1, wherein the first elastic part and the second elastic part are tower-shaped springs.

6. The air inflation-deflation valve as claimed in claim 1, wherein the plug chamber is T-shaped.

* * * * *